United States Patent [19]
Wilder

[11] Patent Number: 4,560,132
[45] Date of Patent: Dec. 24, 1985

[54] STAND FOR DISPLAY DEVICES

[76] Inventor: Leslie N. Wilder, 150 Jennie La., Fairfield, Conn. 06430

[21] Appl. No.: 659,768

[22] Filed: Oct. 11, 1984

[51] Int. Cl.⁴ .............................................. F16M 13/00
[52] U.S. Cl. ..................... 248/396; 248/422; 248/176; 74/422; 74/89.17
[58] Field of Search ............... 248/176, 422, 398, 396, 248/371, 669, 651, 419, 420, 423, 132, 133, 138, 393, 394, 359.1; 297/345, 348; 108/4; 74/422, 89.17, 109; 211/135

[56] References Cited

U.S. PATENT DOCUMENTS

| | | | |
|---|---|---|---|
| 762,096 | 6/1904 | Seymour | 74/422 |
| 957,176 | 5/1910 | Anderson | 248/422 |
| 1,196,084 | 8/1916 | Cogger | 248/422 |
| 1,957,785 | 5/1934 | Knapp | 74/422 |
| 2,177,170 | 10/1939 | Chapel | 248/359.1 |
| 2,430,656 | 11/1947 | Wright | 248/419 |
| 3,073,589 | 1/1963 | Hohwart | 74/422 |
| 4,162,731 | 7/1979 | DeGroot | 211/135 |

FOREIGN PATENT DOCUMENTS

| | | | |
|---|---|---|---|
| 2006816 | 6/1979 | Fed. Rep. of Germany | 248/396 |
| 1232487 | 10/1960 | France | 248/176 |
| 1448282 | 6/1966 | France | 297/338 |
| 608399 | 9/1948 | United Kingdom | 211/135 |
| 2118271 | 10/1983 | United Kingdom | 74/89.17 |

Primary Examiner—J. Franklin Foss
Assistant Examiner—Robert A. Olson
Attorney, Agent, or Firm—McAulay, Fields, Fisher, Goldstein & Nissen

[57] ABSTRACT

An adjustable stand is provided for display devices, such as office equipment, particularly portable computers with integral displays, laboratory test equipment with display devices, home computers, etc., which allows the devices to be supported at a desired height above a support surface and, additionally, allows for the adjustment of the height and of the angle of the display device. The support means provided allows for easy adjustment of the height and angle, while firmly holding the device in the position set for it.

11 Claims, 6 Drawing Figures

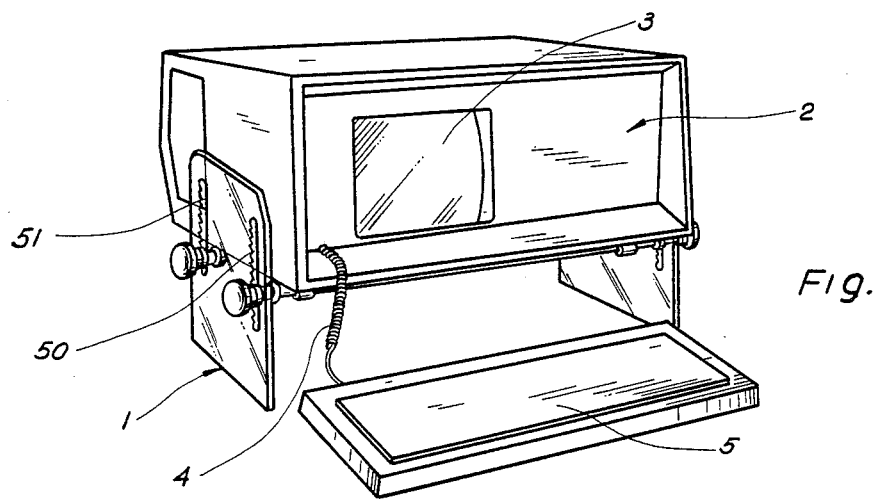
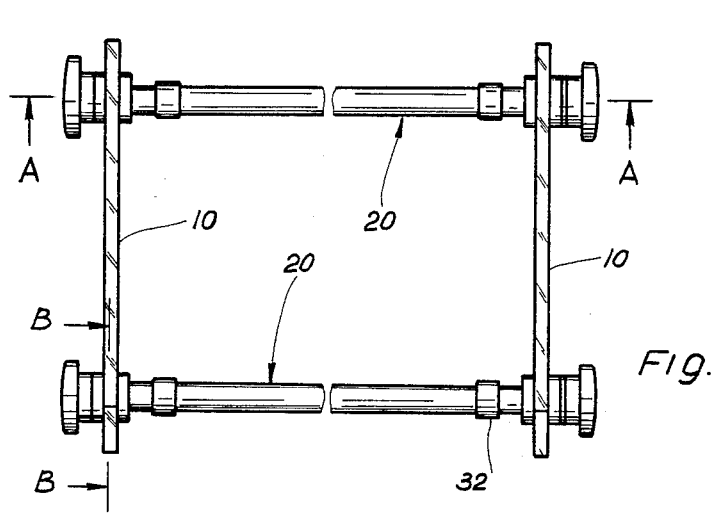
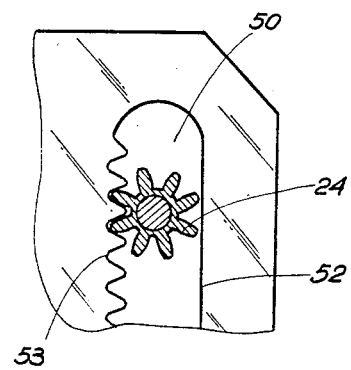
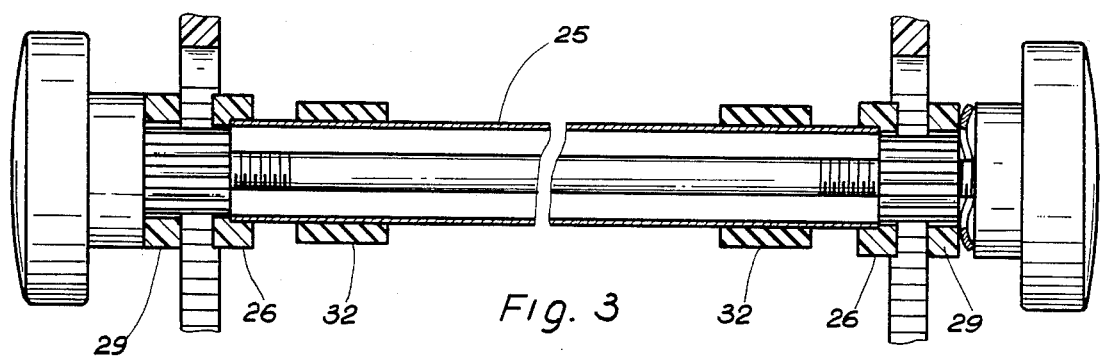
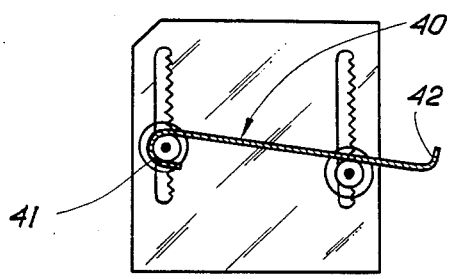

STAND FOR DISPLAY DEVICES

BACKGROUND OF THE INVENTION

Desk or table mounted display devices, such as office equipment, laboratory test equipment, etc., particularly the personal computer, are becoming increasingly common. Many more offices are employing the personal computer, or a variation of it, in word processing equipment. Many of these devices employ a CRT screen which must be used and monitored by the operator for proper functioning of the device. In these uses, the proper angling of the device for screen viewing and the avoidance of glare or reflections on the screen are particularly important.

In the case of personal computers generally, and word processing equipment in particular, accessory items, frequently relatively flat, must be stored with or in proximity to, the viewing equipment. This often includes the keyboard for the word processor which is, most frequently, separate from the computer device, and connected to it only by wiring. When the computer device is placed directly on the desk or table surface, there is frequently insufficient room for the placement or storage of these other items, including the separate keyboard, additional program tapes, etc.

In order to alleviate some of the referenced problems, the computer portion of the device may be mounted on adjustable legs. These may allow for tilting of the CRT screen for better viewing. However, the devices employed in the prior art either do not provide ease of adjustment to allow proper positioning of the viewing screen for all users, or the means of adjustment is extremely cumbersome and often dangerous to the equipment or the viewer, or both.

An easily adjustable stand for a device with a viewing screen, particularly such a stand which allows easy and rapid adjustment over a relatively wide range of heights and angles is extremely desirable. In particular, such a stand should provide for not only ease of adjustment, but for firm positioning after adjustment. This would allow not only for the adjustment necessary when different users of the equipment are involved, but would also provide space for the flat, separate input keyboard, and for additional program materials. The height and angle of the screen could also be adjusted to avoid the glare or reflections which frequently make such devices difficult to use.

In accordance with the present invention, a stand has been developed for the display devices of various types of equipment, the stand allowing for convenient adjustment of the display device. The display device may be, or form part of, a piece of office equipment, a piece of laboratory testing equipment, a portable, personal computer, etc. Adjustment is permitted to a comfortable height and angle, allowing for the reduction or elimination of glare and reflection. The stand also allows for the placement of keyboards, manuals, program disks, etc., under the computer to conserve desk space, or to allow available space to be fully utilized.

Frequently, in addition, equipment of this type is to be displayed in a retail outlet or showroom. The stand allows the proper placement of the device with a viewing screen, or otherwise, for the most advantageous display and examination. Not only is the device allowed to be seen with the greatest enhancement of appearance and attractiveness, but it frequently is possible to show how the relatively portable device can be employed with the same advantages, in many cases, as a larger device of the same type.

BRIEF DESCRIPTION OF THE INVENTION

In accordance with the present invention, a stand has been developed to provide for optimum utilization of display devices. In particular, the device of the present invention is useful, generally, with such equipment having widths of up to 20 inches and weights to up to 50 pounds, though the invention should not be considered as so limited. Ease of adjustment and firm positioning of the supported device are features of the present invention.

To accomplish the ends, the present invention involves the use of two side supports. The material of construction of these supports is not critical, but it is generally chosen for both strength and appearance. For example, the side supports can be formed of acrylic sheets, either clear or colored. If greater strength is desired, metal can be employed. Still further, each side support can be formed of a laminate which includes both metal and plastic members to provide both strength and appearance; further, other constructions are possible for the side supports. As indicated, the material of construction is not critical, and the particular material to be employed can easily be selected by those skilled in the art.

Each of the side supports is formed with two slots, one vertical surface of each slot being serrated to provide, in any desired manner, gear teeth. Extending from one support to the other is a rod, the ends of which are provided with gears adapted to engage with the gear teeth formed on the vertical surface of the slot. A tubular member surrounds each of the rods and the display device rests on these tubular members, either directly or with an intermediary such as a shelf or sleeve members. The provision of a gear at each end of the rod provides for equal movement of both ends of the rod on adjustment and, thus, prevents cocking or jamming of the rod.

The rods, tubular members, and supports are held together and are properly spaced employing suitable bushings, springs, etc. Preferably, the ends of each of the rods are provided with knobs which extend beyond each of the supports to allow for proper movement of the rod up and down in the slots formed in the support. If desired, a knob need be placed on only one end of each rod; since the gear provided at each end of the rod assures equal movement of both ends of the rod, turning of a knob at one end of the rod will provide for movement of the other end, as well. Each of the rods is independently adjustable in height to provide for both upward and downward movement of the display device, and appropriate angling.

BRIEF DESCRIPTION OF THE DRAWINGS

In the accompanying drawings:

FIG. 1 is a perspective view of a stand in accordance with the present invention having a display device mounted on it and a keyboard placed adjacent;

FIG. 2 is a top plan view of the stand of the present invention;

FIG. 3 is a sectional view along the line A—A of FIG. 2;

FIG. 5 is a sectional view along the line B—B of FIG. 2; and

FIG. 6 is an end elevational view of the stand of the present invention showing the use of a shelf for supporting the display device.

DETAILED DESCRIPTION OF THE INVENTION

Figure 4:
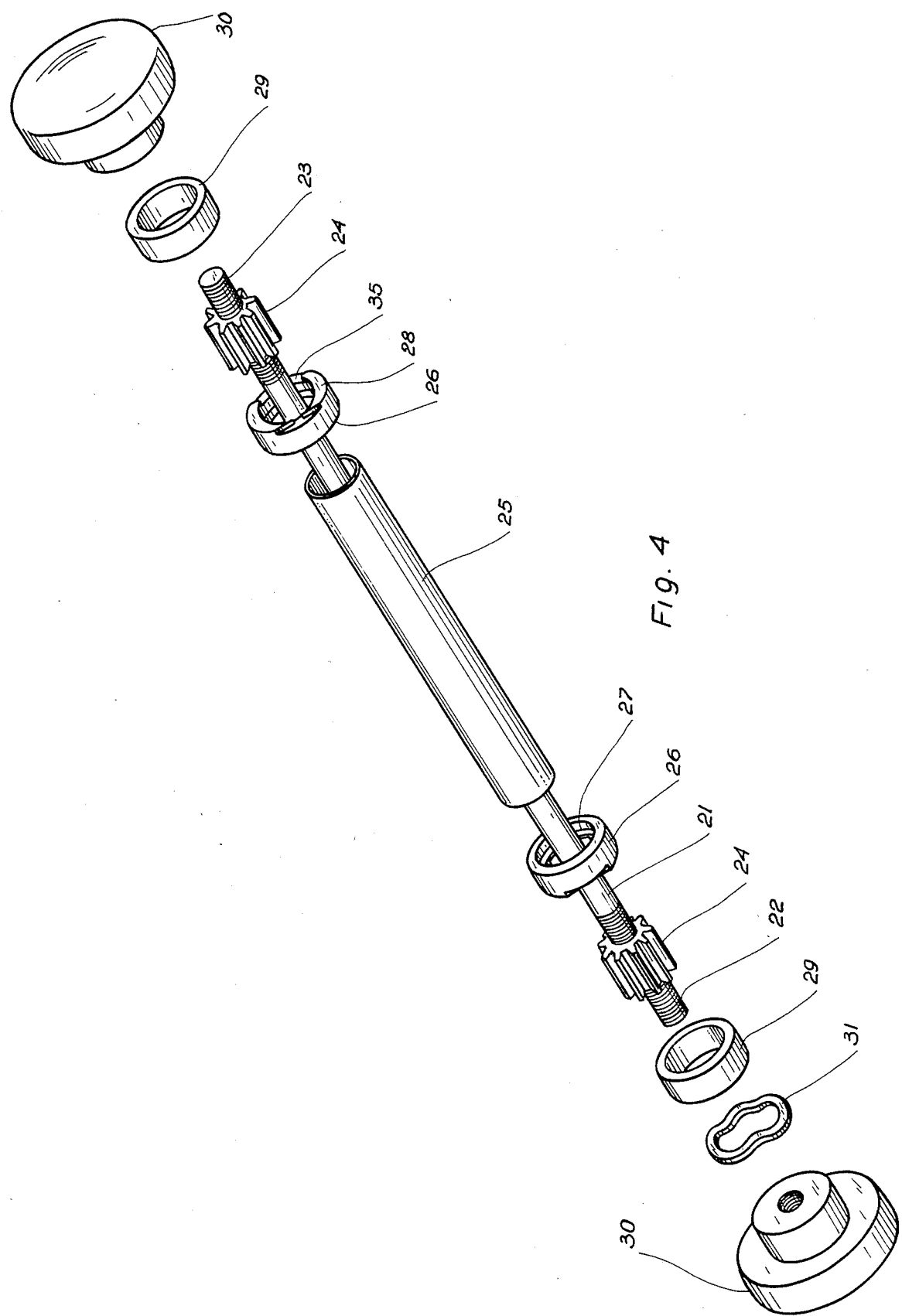
FIG. 4 is an exploded perspective view of the parts making up the rod, tubular member, and associated hardware.

Referring to the accompanying drawings, FIG. 1 shows the stand 1 of the present invention supporting a display device 2 having a viewing screen 3. Attached to the display device 2 by a wire 4 is a keyboard, or similar device, 5. As can be seen, the display device 2 is angled slightly for proper viewing, and the keyboard 5 is placed slightly under the display device for greatest utilization of desk space.

The stand 1, as shown in FIG. 2, includes two side supports 10, which are joined by two equipment support members 20. The details of construction of the equipment support members are best seen in FIGS. 3 and 4.

Each equipment support member 20 includes a rod 21 having two threaded ends 22 and 23. The rod 21 is preferably formed of a metal, such as a steel alloy, but the particular material of construction forms no part of the present invention.

The rod 21 is surrounded by an open cylindrical member 25, the open cylindrical member 25 not being in direct contact with a rod 21. The cylindrical member 25 is held spaced from the rod 21 employing a first bushing 26 at either end of the cylindrical member 25. The bushings 26 are provided with recessed portions 27 into which the ends of the cylindrical member 25 are frictionally fitted. Gears 24 are threadedly engaged with the threaded portions 22 and 23 at either end of rod 21.

Each support 10 is formed with a front slot 50 and a rear slot 51, the two slots being identical, and a magnified version of the upper portion of the slot, being designated 50, is shown in FIG. 5. A first surface 52 of each slot is generally smooth, while the opposite face 53 is serrated to provide gear teeth, the size and spacing of the serrations being such as to interengage with the teeth on gear 24. Each slot 50 or 51 has one associated gear 24.

After the rod 21, with the associated gear 24, is placed through the slot, 50 or 51, provided in the side support 10, a second bushing 29 is placed over the gear 24, on the surface of side support 10 opposite the first bushing 26. While the bushing 29 has two flat surfaces, so that one flat surface rests directly against the outside of side support 10, as best shown in FIGS. 3 and 4, the bushings 26 are formed with projecting portions 28, these projecting portions aiding in centering the gear 24 within the slot 50 or 51. The projecting portions 28 are not centered, but are somewhat offset relative to the center line of the bushing 26. As seen in FIG. 3, the projecting portions 28 of the bushings 26 are placed above and below gear 24, respectively, within the slot 50 or 51. By this construction, the gear 24 remains firmly in engagement with serrations 53, regardless of the specific position of the gear within the slot 50 or 51.

A knob means 30 is attached to the end of rod 21. As illustrated, a knob means is attached to each end; however, in view of the fact that the gears 24 placed within the slots 50 or 51 provide for equal movement of each end of rod 21 upon turning of a knob placed at either end, only one knob is necessary. Two knobs, however, are frequently provided for ease of movement. In the illustrated embodiment, the affixation is accomplished by threading the knob means 30 onto the end of the rod 21. In this embodiment, a high strength cement is placed on the threads 23, prior to insertion of that thread 23 into the knob means 30 to both securely affix the knob means 30 to the rod 21 and to allow for turning of the rod in either direction, so as to allow either raising or lowering of the display device 2. However, the invention is not meant to be limited to this method of affixing the knob means to the rod 21 and any method of firmly affixing the knob means 30 to the rod 21 can be employed, such as cement on a smooth rod, set screws, etc.

In use, after assembly of the various parts, but before final cementing or other firm affixation of knob 30 to the end of rod 21, the members are tightened sufficiently that the cylindrical member 25 is frictionally fixed within recessed portions 27 of bushings 26. The projecting portions 28 of bushings 26 are within slots 50 or 51, with non-projecting portions 35 of bushings 26, and one flat surface of bushings 29, abutting the surfaces of side supports 10. This abutment and frictional fit supports the display device and prevents movement of the entire support structure 20, except when movement is desired and a knob 30 is turned to specifically provide for movement. As previously indicated, the material of construction of rod 21 is immaterial; it is, however, important that the rod be formed of a material which has sufficient strength to transmit the torque from one or more knobs to the gears and to provide adequate tension for clamping of the side supports 10 between bushings 26 and 29. This tension in the rod 29 creates a compression between bushings 26 and 29, transmitted to side supports 10, preventing movement of the support structure 20, except when desired.

The support members 10 frequently have minor variations in thickness, particularly when they are formed of plastic. To assure that the bushings 26 and 29 firmly grip the supports 10, a spring member, such as wave washer 31 is placed between the knob means 30 and the outside bushing 29. As illustrated, this wave washer 31 is placed between only one knob means 30 and bushing 29, and, generally, this is sufficient to accommodate such variations in thickness. However, if desired, the wave washer 31, or other spring means, can be placed between each knob means 30 and outside bushing 29.

In the preferred embodiment, the display device 2 rests directly on the equipment support member 20. However, in order to avoid damage to either the cylindrical member 25 or the device 2, and to prevent sliding of the device 2, particularly when it is placed in a tilted position, frictional members are placed over the cylindrical member 25, prior to assembly. These frictional members can take the form of rubber sleeves 32, as best seen in FIGS. 2 and 3. The specific length of each sleeve 32 is not critical, nor is its material of construction, so long as it provides some resiliency for support of the device 2 and some friction to prevent sliding of the device 2. While only two frictional devices have been shown, it will be appreciated that the sleeve 32 can be formed of a single piece, occupying, essentially, the entire length of cylindrical member 25, that smaller sleeves, in the form of O-rings, can be used, with a sufficient number, or that any other pattern can be employed, so long as the purpose of a frictional member is served.

In a second embodiment, the device 2 can be supported on a shelf which is, in turn, supported by the equipment support structure 20. As illustrated in FIG.

6, a shelf member 40 is provided, on the front side, with a reverse bend 41 which encircles one of the cylindrical members 25, preferably the one at the front of the stand 1, while a lip 42 is formed on the opposite end of the shelf 40 to prevent the device 2 from sliding off the stand 1. Other means for supporting the device 2 will be apparent to those skilled in the art.

In operation, a display device 2 is placed, reasonably centered, on the two equipment support members 20, regardless of the particular holding means provided for the device, i.e., the frictional members 32, shelf 40, or other appropriate device. The height and angling of the device 2 is then adjusted by turning the appropriate knobs 30. As best shown in FIG. 5, clockwise movement of a knob 30 will result in that particular equipment support member being lowered, while counterclockwise movement of a knob 30 will result in that particular equipment support member being raised.

As will be apparent, in view of the fact that each knob means 30 is firmly affixed to its rod 21, turning of the knob means on either end of a device support means 20 will result in movement of that device support means 20 up or down, depending upon the direction of rotation. Generally, however, it is easier if both the knob means 30 of a single equipment support member 20 are turned simultaneously. Also, generally one of the equipment support members 20 is adjusted prior to adjustment of the other equipment support members 20. Once the general height and angling of device 2 is accomplished, the height and angle can be "fine tuned" by minor adjustments of one or both of the equipment support members 20.

As indicated above, the invention requires only a single knob 30 on one end of a rod 21 of a particular equipment support member 20. When only one knob 30 is thus provided, in order to provide for sufficient tension in rod 21, the other end of that rod will be capped with some type of device, known to the art (not illustrated) to allow sufficient tension to be developed in rod 21 when knob 30, at the opposite end, is tightened. As previously indicated, it is important that the rod 21 be formed of a material which allows this tension to be developed. This type of structure can only be employed when the rod 21 is formed of a material which provides for transmission of sufficient tension without twisting, so that the gears 24 on either end of rod 21 turn without significant angular displacement between them, assuring parallel vertical movement of the entire equipment support member 20.

In a further modification, the knob at one end of a rod can be firmly attached to the end of that rod as by cementing, cementing over a threaded end, etc., while a knob is placed on the opposite end of the rod merely by threaded attachment. The structure is otherwise the same as that illustrated, particularly, in FIGS. 3 and 4. In this embodiment, tension is developed in rod 21, as earlier described, in order to frictionally engage bushings 26 and 29 with side supports 10, and cylindrical member 25 with recessed portions 27 of bushings 26, by threading the non-firmly attached knob sufficiently to accomplish the tensioning. When that equipment support member 20 is to be moved, the threadedly attached knob is loosened, and the equipment support member 25 is moved by rotation of the firmly affixed knob at the opposite end, after which the threadedly attached knob is retightened.

While specific embodiments of the invention have been shown and described, the invention should not be considered as limited except as set forth in the appended claims.

I claim:

1. A stand for support of display device, said stand comprising:
   a. a first side support means having a first generally vertical slot formed therein, one face of said slot being generally smooth and one face of said slot being provided with serrations, and a second slot, one face of said slot being generally smooth and one face of said slot being provided with serrations;
   b. a second side support means having a first generally vertical slot formed therein, one face of said slot being generally smooth and one face of said slot being provided with serrations, and a second slot, one face of said slot being generally smooth and one face of said slot being provided with serrations;
   c. a first equipment support member including a rod having first and second ends extending through said first slot of said first side support means and said first slot of said second side support means, the serrated face of each slot facing in the same direction, a first gear mounted on a first end of said rod and engaging the serrations of said first slot in said first side support means and a second gear mounted on the second end of said rod and engaging said serrations in said first slot in said second side support means, and means mounted on at least one end of said rod, outwardly of said side support means, for movement of said equipment support member;
   d. a second equipment support member including a second rod having first and second ends extending through said second slot of said first side support means and said second slot of said second side support means, the serrated face on each slot facing in the same direction, a third gear mounted on the first end of said second rod and engaging the serrations of said second slot in said first side support means and a fourth gear mounted on the second end of said second rod and engaging said serrations in said second slot in said second side support means, and means mounted on at least one end of said second rod, outwardly of said side support means, for movement of said equipment support member; and
   e. a cylindrical member being mounted on each rod member, said cylindrical member being held in place by a first bushing at each end, said first bushing abutting and lying inwardly of each side support, each said first bushing being provided with projecting portions adapted to engage within the associated slots.

2. The stand of claim 1 wherein a second bushing is placed on each end of each said rod, said second bushing abutting and lying outwardly of each side support and inwardly of said movement means.

3. The stand of claim 2 wherein said means for movement of said equipment support member is knob means and is firmly affixed to each end of each said rod, outwardly of said second bushing.

4. The stand of claim 3 wherein a spring member is provided on at least one end of each said rod between said knob means and said second bushing.

5. The stand of claim 4 wherein said spring means is a wave washer.

6. The stand of claim 4 wherein said spring means is provided at each end of each said rod.

7. The stand of claim 1 wherein frictional means are placed over each cylindrical member.

8. The stand of claim 7 wherein said frictional means are in the form of sleeves, at least two spaced sleeves being placed on each cylindrical member.

9. The stand of claim 1 wherein a shelf is provided for supporting said display device, said shelf being supported by both of said equipment support members, said shelf resting on 10. The stand of claim 9 wherein one end of said shelf is formed with a reverse bend to be placed around one of said cylindrical member and the opposite end of said shelf is provided with a lip.

11. The stand of claim 2 wherein said means for movement of said equipment support member is knob means and is firmly affixed to one end of each said rod, outwardly of said second bushing, and a second knob is threadedly attached to the opposite end of said rod, outwardly of said second bushing.

* * * * *

UNITED STATES PATENT AND TRADEMARK OFFICE
CERTIFICATE OF CORRECTION

PATENT NO. : 4,560,132
DATED : December 24, 1985
INVENTOR(S) : Leslie N. Wilder

It is certified that error appears in the above-identified patent and that said Letters Patent are hereby corrected as shown below:

At Claim 9, Col. 7, line 11, the following should be inserted after "resting on" -- said cylindrical members. --

Signed and Sealed this

Fifteenth Day of April 1986

[SEAL]

Attest:

DONALD J. QUIGG

Attesting Officer

Commissioner of Patents and Trademarks